United States Patent
Johansson et al.

(10) Patent No.: US 11,768,986 B2
(45) Date of Patent: Sep. 26, 2023

(54) HIGH-DIMENSIONAL MULTI-DISTRIBUTED IMPORTANCE SAMPLING FOR CIRCUIT YIELD ANALYSIS

(71) Applicant: XENERGIC AB, Lund (SE)

(72) Inventors: Tom Johansson, Lund (SE); Hemanth Prabhu, Lund (SE); Arturo Prieto Llorens, Lund (SE); Babak Mohammadi, Lund (SE)

(73) Assignee: XENERGIC AB

( * ) Notice: Subject to any disclaimer, the term of this patent is extended or adjusted under 35 U.S.C. 154(b) by 199 days.

(21) Appl. No.: 17/438,716

(22) PCT Filed: Mar. 13, 2020

(86) PCT No.: PCT/EP2020/056890
§ 371 (c)(1),
(2) Date: Sep. 13, 2021

(87) PCT Pub. No.: WO2020/182992
PCT Pub. Date: Sep. 17, 2020

(65) Prior Publication Data
US 2022/0156442 A1     May 19, 2022

(30) Foreign Application Priority Data

Mar. 14, 2019   (EP) .................................... 19162801

(51) Int. Cl.
*G06F 119/22* (2020.01)
*G06F 30/33* (2020.01)
(52) U.S. Cl.
CPC .......... *G06F 30/33* (2020.01); *G06F 2119/22* (2020.01)
(58) Field of Classification Search
CPC ... G06F 30/33; G06F 2119/22; G06F 2111/08
See application file for complete search history.

(56) References Cited

U.S. PATENT DOCUMENTS 8,074,189 B2   12/2011   McConaghy et al.
8,443,329 B2    5/2013   McConaghy
(Continued)

FOREIGN PATENT DOCUMENTS

WO   2012055045 A2   5/2012

OTHER PUBLICATIONS

Mixture distribution—Wikipedia, May 18, 2018 (May 18, 2018), Retrievedfrom the Internet:[retrieved on Sep. 24, 2019].
(Continued)

*Primary Examiner* — Rehana Perveen
*Assistant Examiner* — Cuong V Luu
(74) *Attorney, Agent, or Firm* — DINSMORE & SHOHL LLP

(57) ABSTRACT

A computer-implemented method for simulation of an integrated circuit for yield analysis includes: a) for plurality of variables, generating initial sampling sets by sampling from provided distributions related to physical properties of circuits; b) selecting at least one sample from each initial set randomly and combining into initial simulation set; c) running initial simulation of operation of circuit, applying initial simulation set, the operation having passing/failing criterion; d) if fails: storing samples of initial set into initial sampling distributions for each variable; e) repeating steps b)-d) until sufficient failures obtained; f) building importance sampling distribution based on each initial sampling distribution, the importance distribution having lower, center, upper portions; g) generating secondary simulation set by drawing samples from importance sampling distribution for each variable; h) simulating circuit by applying the secondary set; i) repeating steps g)-h); j) mapping resulting yields to provided distributions, to obtain a yield.

16 Claims, 5 Drawing Sheets

(56) References Cited

U.S. PATENT DOCUMENTS

| | | | |
|---|---|---|---|
| 8,494,670 B2 | 7/2013 | McConaghy et al. | |
| 9,348,680 B2 | 5/2016 | Joshi et al. | |
| 9,846,753 B2 | 12/2017 | Lee et al. | |
| 10,853,550 B1 * | 12/2020 | Zhang | G06F 30/367 |
| 2011/0153272 A1 * | 6/2011 | Tiwary | G01R 31/2894 |
| | | | 702/181 |
| 2016/0063156 A1 | 3/2016 | Joshi et al. | |
| 2016/0283629 A1 | 9/2016 | Weckx et al. | |
| 2017/0059649 A1 | 3/2017 | Joshi et al. | |
| 2018/0074124 A1 | 3/2018 | Xu et al. | |
| 2018/0300288 A1 | 10/2018 | Xu et al. | |

OTHER PUBLICATIONS

Importance sampling—Wikipedia, , Feb. 11, 2019 (Feb. 11, 2019), Retrieved from the Internet: [retrieved on Sep. 24, 2019].

Asok, K.J. et al., Efficient Statistical Model Checking of Hardware Circuits With Multiple Failure Regions, "IEEE Transactions on Computer-Aided Design of Integrated Circuits and Systems" vol. 33, No. 6., pp. 945-958, Jun. 1, 2014.

* cited by examiner

HIGH-DIMENSIONAL MULTI-DISTRIBUTED IMPORTANCE SAMPLING FOR CIRCUIT YIELD ANALYSIS

CROSS-REFERENCE TO RELATED APPLICATIONS

This application is the U.S. national stage of PCT/EP2020/056890 filed Mar. 13, 2020, which claims priority of European patent application 19162801.5 filed Mar. 14, 2019, both of which are hereby incorporated by reference in their entirety.

FIELD OF THE INVENTION

The present invention relates to a computer-implemented method for simulation of an integrated circuit for yield analysis of the integrated circuit.

BACKGROUND OF THE INVENTION

When implementing an integrated circuit, the circuit is typically tested using Monte Carlo (MC) simulations in order to verify that its performance meets certain given constraints, taking into account process variations from the production. The number of system variables that need to be analyzed in combination with a low failure rate per memory block results in very resource demanding MC simulations. Typically, to acquire good statistics, at least 100 failures need to be detected. This may not seem much, however, certain circuit blocks, such as static random access memory (SRAM) bitcells, are commonly repeated millions of times on the same chip. Consequently, the failure rate per bitcell can typically be on the order of $10^{-9}$ in order to achieve an acceptable yield, such as 90%, for the entire integrated circuit.

Considering these criterias, the MC simulations to detect these failures could result in unreasonably large demands on computational resources with simulations which could take years to perform, making them practically impossible. Consequently, there is a significant need for a method which can enable simulation of such integrated circuits while maintaining high accuracy and efficiency. Importance sampling has recently been shown to be a successful candidate in reducing simulation times of integrated circuits. Despite this progress in circuit yield analysis there are still many challenges remaining, for example the difficulty of identifying the sources of the failures to further improve the efficiency of the circuit yield analysis.

SUMMARY OF THE INVENTION

The present disclosure relates to a computer-implemented method for improving the efficiency and accuracy in circuit yield analysis using importance sampling, comprising:
a) for a plurality of variables, generating initial sampling sets by sampling from distributions, which are based on provided distributions, related to physical properties of the integrated circuits;
b) selecting at least one sample from each initial sampling set randomly and combining the selected samples into an initial simulation set;
c) running an initial simulation of an operation of the integrated circuit, applying the initial simulation set, wherein the operation has a criterion for passing and failing the operation;
d) if the initial simulation fails: storing the samples of the initial simulation set into initial sampling distributions for each variable;
e) repeating steps b)-d) until a sufficient number of failures have been obtained;
f) building an importance sampling distribution based on each initial sampling distribution, wherein the importance sampling distribution comprises a mixture distribution having three sub-distributions corresponding to a lower portion, a center portion and an upper portion, wherein the three sub-distributions of the importance sampling distribution are transformations of the provided distribution according to a function of the initial sampling distribution for each variable, wherein the transformation of the provided distribution for generation of the importance sampling distribution are given by weighing portions of the initial sampling distribution for each variable;
g) generating a secondary simulation set by drawing a number of samples from the importance sampling distribution for each variable;
h) simulating the integrated circuit by applying the secondary simulation set;
i) repeating steps g)-h) a number of times;
j) mapping of the resulting yields to the provided distributions, thereby obtaining a yield of the integrated circuit.

Preferably one initial sampling set is generated for each system variable which thereafter gives rises to an importance sampling distribution. Thereby it may be deduced how variables independent or jointly of all other variables contribute to the failure rate of the integrated circuit system. By carrying out the yield analysis in such a way the efficiency and accuracy of identification of the rare failure rate regions may be optimized, leading to a decrease in requirement in time and/or computational resources. Furthermore, an important aspect of the current method is its robustness and flexibility which stems from that it is able to analyse the circuit yield without having pre-existing knowledge about the system.

The present method may involve the construction of discrete initial sampling distributions wherein the failed simulations of the initial sampling sets are stored for each variable individually. Each one of these distributions may thereafter be used in order to construct an importance sampling distribution, which comprises a mixture distribution. Preferably, the mixture distributions are constructed in such a way as to best reflect the failure regions of the system. For example, the mixture distributions may comprise the use of three sub-distributions, which reflects the regions where the rare failure events are expected to occur. An important aspect of the present method is how the mixture distribution is generated from the initial sampling distribution as this lays the foundation for the circuit yield analysis of the integrated circuit. Preferably, the three sections of the importance sampling distribution are all based on the provided distribution of that specific variable. This could for example be the result where the provided distribution is transformed three times as a function of weighing specific portions of the initial sampling distribution. These transformations, which give rise to the sub-distributions of the importance sampling distribution, could for example include translations in order to shift the means of the distributions and/or being normalized according to a certain criterion/criteria. The three distributions could further have a specific dependency, such as an inverse relationship between the outer portions and the inner portions or that the entire mixture distribution has a specific area, in order to better capture the rare failure regions.

Three distinct portions may be used in order to reflect regions where rare failure events are likely to occur. The importance sampling distribution of a specific system variable will then be dependent on how that specific variable affects the system. The distribution may for example be highly asymmetric failures which are only detected in one high-sigma tail of the provided distribution. Contrary, if the system variable only gives rise to a very limited number of failures, the importance sampling distribution of that specific variable is expected to be more closely related to the given distribution.

Preferably, the importance sampling distributions are dynamically modified following the secondary simulations in order to fulfil a given criterion to further optimize the capturing of rare failures and finding the important failure regions of the system. These modifications may for example include, but are not limited to, translational shifts of the outer portions of the importance sampling distribution and/or modifying the relative ratio of the outer and inner portions and/or changing parameters of the distribution itself. These modifications may be carried out if a certain criterion is fulfilled, such as having the failure rate above or below a certain threshold value. The usefulness of this can for example be if a situation arises wherein one or multiple variables display failures in a significant fraction of their respective importance sampling distribution. Modifying the distributions by for example having a translational shift of the outer regions of the relevant variables to being closer to the centre may result in an ability to better capture the interesting failure regions as this would suppress results which otherwise could constitute background noise in the yield analysis.

Much in the same way, having system variables, which gives rise to very few failures, such as below 10%, or such as below 5%, may be a waste of computational resources. By implementing an iterative process wherein parameters of the importance sampling distribution is dynamically updated in a similar manner may have the added benefit of eliminating the waste of computational resources. In this case, the translational shift of the outer distributions may instead be directed away from the centre and/or the relative weight of the outer distribution may be increased. In this way, the accuracy and efficiency of the yield analysis of the integrated circuit may be continuously updated based on the yield analysis itself.

Preferably, the transformation of the provided distribution into the mixture distribution of the importance sampling distribution is carried out by the use of weighing parameters. These weighing parameters, preferably two, may be acquired for each variable to reflect the weights of different portions in the initial sampling distribution. Thereafter they may be applied to the provided distribution of that variable in such a way as to give rise to separate portions in the mixture distribution, which corresponds to the portions of the initial sampling distribution. The acquisition of the weighing parameters may be based on, but not limited to,
  i. clustering of the initial sampling distribution into three separate bins normalized with respect to the value span of each cluster and thereafter the separate weighing of the centre bin with respect to each outer bin;
  ii. the relationship between the global minimum and the maximum of each half side of the distribution;
  iii. linear regression between a global minimum to the outer edges and extraction wherein the weighing parameters are given by the slopes.

The above operations may further be combined with a continuous convolution operation to transform the distributions into a continuous function.

The resulting importance sampling distributions for each variable may comprise a number of sub-distributions being different types. These types may be, but are not limited to, statistical distributions such as Gaussians or Log distributions. An exemplary Gaussian function may consequently be given by the following probability density function $$\text{MixGauss} = \lambda N(\mu - f(r_l) \cdot c, \sigma_1^2) + (1 - 2\lambda) \cdot N(\mu, \sigma_2^2) + \lambda N(\mu - f(r_r) \cdot c, \sigma_1^2)$$

where $r_l$ and $r_r$ are the weighing parameters deduced from the initial sampling distribution, f is an arbitrary function, $N(\mu, \sigma^2)$ denotes a Gaussian function, $\mu$ is the mean, $\lambda$ is a weighing factor determining the relative weight of the centre and outer portions, c denotes a control factor and $\sigma_1^2$ and $\sigma_2^2$ are variances, with values such as 1. The three separate terms may be the three transformations of the provided distributions, which may have been deduced by the initial sampling distribution.

DETAILED DESCRIPTION OF THE INVENTION

Figure 1:
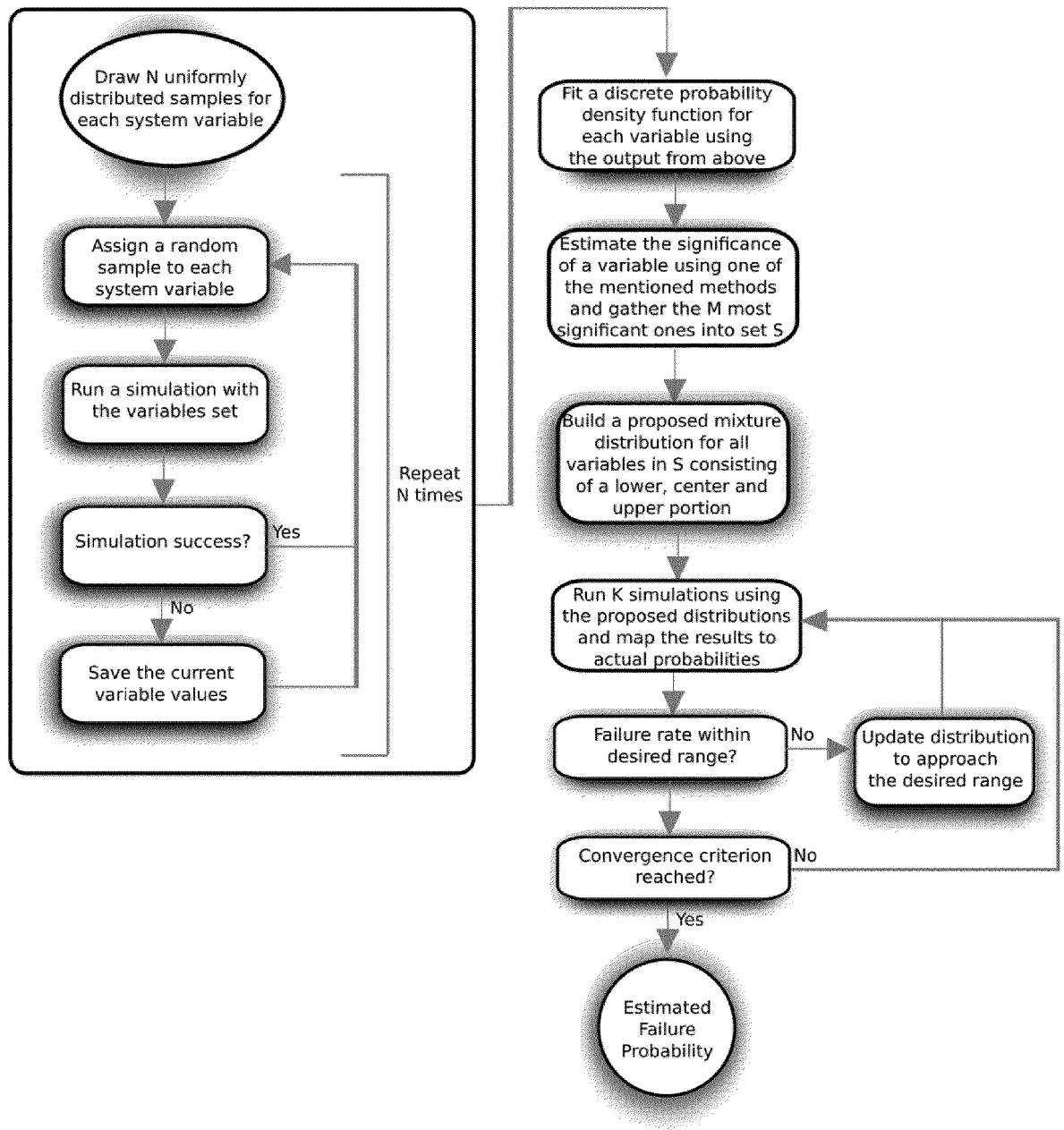
FIG. 1 shows a flow chart outlining a method for circuit yield analysis according to an embodiment of the present disclosure, wherein the importance sampling distribution may be dynamically updated according to a given criteria, in order to provide a yield of the integrated circuit.

The present disclosure relates to a computer-implemented method for simulation of an integrated circuit for yield analysis of the integrated circuit. In a preferred embodiment, initial sampling sets are generated from provided distributions related to physical properties of integrated circuits, such as by sampling from a uniform distribution based on the provided distribution, for that variable. These initial sampling sets may thereafter be utilized in order to generate initial sampling sets by randomly sampling one value for each system variable, consequently, the simulation sets comprise all system variables. The initial simulation sets could be applied in an initial simulation of a specific operation of the integrated circuit, wherein the operation may have a predetermined criterion for passing and failing the operation. Depending on the outcome of the simulation, the initial simulation set may either be saved, in the case of a failed simulation, or discarded, in the case of a successful simulation. The number of simulations may be, but are not limited to, a predetermined number, carried out until a predetermined number of failures are received or allowed to continue until a saturation of the distributions are achieved.

An initial sampling distribution consisting of a discrete probability distribution over the stored, failed, samples may be generated for each system variable. Consequently, depending on how the system variable affects the yield of the integrated circuit the initial sampling distribution may have a significantly varying appearance.

In a preferred embodiment of the present disclosure, an importance sampling distribution is generated which build on the initial sampling distribution, of that specific variable. The importance sampling distribution may have three distinct portions. Additionally, a second simulation set may be generated by drawing a number of samples from the importance sampling distribution. In this way, the importance sampling distribution would also comprise a sample of each system variable. However, compared to the initial sampling distribution the current sampling set may differ significantly due to the possible transformation of the distributions. The secondary simulation set may be applied to a similar or identical operation as the initial sampling set wherein a similar or identical criterion for passing or failing the operation may be given. The simulation is allowed to be carried out a sufficient number of times, such as but not limited to a predetermined number or until a saturation of the values are received. Results from the simulation may thereafter be mapped to the provided distribution, for each variable, thereby obtaining a yield of the integrated circuit. When referring to the integrated circuit this may be one of many types of circuits, such as SRAM circuits. In a preferred embodiment of the present disclosure, the method may be used for obtaining rare failure events. These may be located in a multiparametric space, given by system variables of the circuit.

In an embodiment of the present disclosure the routine of selecting at least one sample from each initial sampling set randomly and combining the selected samples into an initial simulation set and running an initial simulation of an operation of the integrated circuit, applying the initial simulation set, wherein the operation has a criterion for passing and failing the operation; and if the initial simulation fails: storing the samples of the initial simulation set into initial sampling distributions for each variable may be repeated a number of times. The number may be predetermined, or until a predetermined number of failures have been reached, or have a statistical distribution, such that the number is sampled from this distribution for each round. Additionally, the number of times for repeating the routine may be given by a saturation criterion of the initial sampling distribution. The saturation criterion may be such that the routine stops when there are no significant changes over a certain number of repeats.

In another embodiment of the present disclosure the routine of generating a secondary simulation set by drawing a number of samples from the importance sampling distribution for each variable and simulating the integrated circuit by applying the secondary simulation set may be repeated a number of times. The number may be predetermined, or until a predetermined number of failures have been reached, or have a statistical distribution, such that the number is sampled from this distribution for each round.

Additionally, the number of times for repeating the routine may be given by a saturation criterion of the initial sampling distribution. The saturation criterion may be such that the routine stops when there are no significant changes over a certain number of repeats.

In a preferred embodiment of the present disclosure, the initial sampling sets are generated by uniform sampling, but in other embodiments the initial sampling sets are generated based on other types of distributions, such as Gaussian distribution or Poisson distribution or any other appropriate statistical distribution.

Further, the initial sampling sets may be sampled from a provided distribution, such as a Gaussian distribution. The distribution may reflect the variability in manufacturing causing a distribution among the system variables. The distributions may be provided by a manufacturer of integrated circuits, with for example an expected mean and an expected standard deviation.

In an embodiment of the present invention the initial sampling is carried out over a predefined range of the provided distribution, such as from $-5\sigma$ to $5\sigma$, from $-6\sigma$ to $6\sigma$, or from $-7\sigma$ to $7\sigma$. The predefined range may be chosen such that a certain number of failures are expected to occur therein.

In one preferred embodiment, the generation of sample sets are carried out independent for each variable. This may include that one provided distribution is used in order to provide initial value sets for each variable. Additionally, this could also include that following an initial simulation the failed variables are independently stored as initial sampling distributions where each initial sampling distribution is used to create an importance sampling distribution based on weighing of different portions therein. Other embodiments include dependencies among the variables in certain aspects. This may include limitations such that the same number cannot be sampled multiple times, even in separate sampling rounds. Additionally, the sampling of a specific value for one variable may have an influence on the sampling range of another variable. For example, sampling of a value from a specific portion of a given variable may result in that values within this relative portion of another variable either has an increased or decreased likeliness of being sampled.

Building Importance Sampling Distributions

As previously stated, one importance sampling distribution may be generated for each variable of the system. Additionally, in order to save computational resources, importance sampling distributions may only be generated for variables that are considered to have a significant effect on the yield of the system. This may be done by analyzing the significance of each variable, and the M most significant ones are selected and gathered into a set S. The initial sampling distributions of each system variable in S may thereafter be used to construct, for each, an importance sampling distribution having a lower, a center and an upper portion.

Preferably, the importance sampling distribution may comprise multiple sub-distributions. This may for example be used in order to provide better coverage of the important failure regions in the multiparametric space. The importance sampling distribution may consequently be a mixture distribution. Preferably, the importance sampling distribution comprises three sub-distributions, such as three Gaussian distributions. In this case, the three sub-distributions may correspond to three specific portions in the importance sampling distribution: a lower, a center, and an upper portion. These three sub-distributions of the importance sampling distribution may all be transformation of the provided Gaussian distribution. Preferably the center portion of the importance sampling distribution does not comprise a translational shift while the outer portions (the lower and upper portions) comprise a translational shift of their respective mean values such that the mean of the lower distribution decreases according to a given function while the distribution of the upper portion may increase according to another given function. In addition, of the possible translational shift of the means of the different portions of the importance sampling distribution, the transformation may further comprise additional modifications to a single or multiple parts thereof, such as scaling or normalization according to a given criterion. The possible transformation of the provided distribution into each of the three sub-distributions of the importance sampling distribution may be derived from the initial sampling distribution for that specific variable. The transformation is dependent on the initial sampling distribution and may affect the three sub-distributions differently. The transformation may for example be based on the weighing of portions of the initial sampling distribution.

Weighing of Initial Sampling Distribution

The weighing of various portions of the initial sampling distribution may be based on for example the frequency of samples falling within specific ranges of the distribution, such as the relative number of samples falling into each portion of the initial sampling distribution, normalized to the width of the portion.

The weighing may further be carried out by dividing the initial sampling distribution into three separate sections, such as by dividing the range of the uniform distribution in three, which may have equal lengths. The number of failures within each, or the relative number of failures, of the two outer portions of the initial sampling distribution may thereafter be used in order to acquire parameters that are used in building the importance sampling distribution, such as the transformation of a provided distribution.

Additionally, the weighing may be based on relative ratios between portions of the distribution. This may be the local maximum and the minimum for the range, such that if the range is divided into two equal sections each maximum may be divided by the minimum for the entire range. Here, the range may refer to all values from where samples to the initial sampling set were drawn.

Further, the weighing of sections of the initial sampling distribution may include linear regression. This could for example be carried out in such a way as having each portion of the mixture distribution corresponding to a slope value.

In another embodiment of the present disclosure the weighing is carried out by measuring the relative number of samples, falling within two portions positioned at a certain distance from the mean of the provided distribution for that variable. These portions having a certain width and wherein they are normalized according to that width. Additionally, these transformations may be carried out in relationship with a continuous convolution operation in order to convert the discrete initial sampling distribution to a continuous distribution from which the values are derived.

Importance Sampling Distribution

In another embodiment of the current disclosure the derived values from the weighing of the initial sampling distribution is used in order to build an importance sampling distribution for each variable. The importance sampling distribution may comprise a mixture distribution having multiple sub-distributions, wherein the sub-distributions may comprise different types of distributions. The sub-distributions may be solely Gaussian distributions or the sub-distributions may be lognormal distributions or the sub-distributions may be log distribution or the sub-distributions may be a combination of any statistical distribution, such as lognormal and Gaussian distributions. Preferably, the number of sub-distributions is at least 1, more preferably, the number of sub-distributions is at least 2, most preferably the number of sub-distributions is 3.

In another embodiment of the present disclosure, the importance sampling distribution is given by a mixture Gaussian distribution according to:

$$\text{MixGauss} = \lambda N(\mu - f(r_l) \cdot c, \sigma_1^2) + (1-2\lambda) \cdot N(\mu, \sigma_2^2) + \lambda N(\mu - f(r_r) \cdot c, \sigma_1^2)$$

where $r_l$ and $r_r$ are the weighing parameters deduced from the initial sampling distribution, f is an arbitrary function, $N(\mu, \sigma^2)$ denotes a Gaussian function, $\mu$ is the mean, $\lambda$ is a weighing factor determining the relative weight of the center and outer portions, c denotes a control factor and $\sigma_1^2$ and $\sigma_2^2$ are variances of the distribution, with values such as 1. The three separate terms may be the three transformations of the provided distributions, which may have been deduced by the initial sampling distribution. Wherein the mean, $\mu$, and the variance, $\sigma^2$, may be given by the provided distribution.

In certain embodiments of the present disclosure, the variance may equal 1, but in other embodiments this value may be higher or lower depending on the distribution.

In another embodiment of the present disclosure, the function given above may further have other distributions instead or in addition to the mentioned Gaussian distributions.

The three portions of the importance sampling distributions may all be a function of the initial sampling distribution in combination with the provided distribution. The provided distribution may be transformed according to three separate predetermined criteria which may include translations wherein the mean is shifted and/or scaled or any other transformation.

Truncation

In another embodiment of the present disclosure, a truncation operation may be applied to the importance sampling distributions. In the embodiment where the importance sampling distribution consists of a mixture distribution having Gaussian sub-distributions, the resulting distributions may be truncated Gaussian sub-distributions. The truncation of the function may lead to improvements for mapping of derived failure rates to the predetermined functions in order to obtain a yield for the integrated circuit.

The truncation may be a function of the ratio between the provided distributions and the importance sampling distribution. The truncation may for example occur at positions where the importance sampling distribution has an identical or lower value than the provided distribution, which may be combined with any possible normalizations or secondary functions have been applied.

Dynamic Updating of the Importance Sampling Distribution

In yet another embodiment of the present disclosure the importance sampling distribution may be dynamically updated in order to better find low failure rate regions in a multiparametric space.

Parameters of the importance sampling distribution may be dynamically updated following a number of simulations, given by a predetermined criterion, in order to better capture the important failure regions. The number of simulations before dynamically updating the importance sampling distribution of a specific variable may be a predetermined number, such as 100, or it may be based on the failure rate of the simulated variable. The criterion for if the importance sampling distribution should be updated or not may be based on if the simulated failure rate is within a predetermined acceptable range, such as between 5% and 50%, more preferably between 10% and 35%, most preferably between 15% and 25%.

The parameters to update may be according to a predetermined function for increasing or decreasing the failure rate of that specific variable, such as a factor of the failure rate and/or a function of the importance sampling distribution. In another embodiment the importance sampling distribution are dynamically modified following simulations in order to fulfil a predetermined criterion, which may be related, but not limited to, the variable of the importance sampling distribution to update. In this embodiment, the sampling distribution may be dynamically modified after a certain number of simulations, such as 100. The parameters to update may include the weighing factor, which may result in a modification in the relative scaling between sub-distributions of the importance sampling distribution. This may for example include, but are not limited to, affecting the sub-distributions such that the weighing of the outer portions either increases or decrease a specific factor, while the inner portion decreases or increases accordingly in order to maintain a normalized mixture function. In another embodiment, the control factor may be updated in order to better capture failure regions. This results in a translation of the sub-distributions such that their respective mean values are shifted. This may include shifts where only the two outer portions are affected, and further, were they are shifted an equal amount but in opposite directions.

In yet another embodiment a combination of the control factor and the weighing parameters may be updated based on a predetermined function, such that the dynamical modification of the importance sampling distribution, of a specific variable, includes both a translation and scaling. Scaling may be carried out by multiplying each value in the distribution, or sub-distributions with a certain number, which may result in a proportional decrease or increase in the relative frequencies of that distribution.

DETAILED DESCRIPTION OF DRAWINGS

The invention will in the following be described in greater detail with reference to the accompanying drawings. The drawings are exemplary and are intended to illustrate some of the features of the presently disclosed method for simulation of an integrated circuit, and are not to be construed as limiting to the presently disclosed invention.

FIG. 1 shows a flow chart outlining a method for circuit yield analysis according to an embodiment of the present invention, wherein initial simulations are carried out in order to provide an estimation of the distribution of important failure regions within the multiparametric space. This is based on provided distribution, from which initial sampling sets are generated by sampling, such as uniform sampling, for each variable. From each initial sampling set, a system variable is drawn, such that an initial simulation set is generated which is simulated according to a given operation. After repeating the process a number of times, such as a predetermined number, the results is used to build initial sampling distributions. From here, the significance of each variable is analyzed, and the M most significant ones are selected and gathered into a set S. The initial sampling distributions of each system variable in S is used to construct, for each, an importance sampling distribution having a lower, a center and an upper portion. A number of simulations, given the proposed distributions are carried out, such as a predetermined number or until a convergence criterion has been reached. Preferably, the importance sampling distributions are dynamically updated such that the failure rate is within a desired range, preferably for each variable.

Provided distribution of system variables are used in order to, for each variable construct initial sampling sets. The failure rate of the simulations may further be used in mapping in order to provide an estimation of the failure probability and the yield of the integrated circuit.

Figure 2:
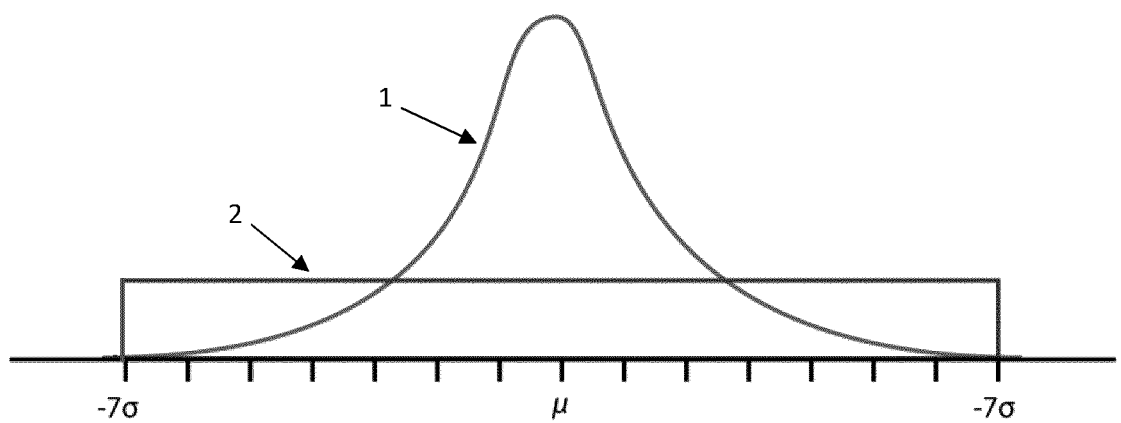
FIG. 2 shows a provided Gaussian distribution of a system variable according to an embodiment of the present invention. Initial sample sets may be generated by sampling from a uniform distribution based on the provided distribution.

FIG. 2 shows a provided Gaussian distribution (1) of a system variable according to an embodiment of the present invention. Initial sample sets are generated by sampling from a uniform distribution (2), which may be based on the provided distribution. Its range may be given by a predetermined number, such as from $-7\sigma$ to $7\sigma$. A number of samples are drawn in order to generate an initial sampling set. This process is repeated preferably for as many times as there are system variables to be analyzed. While the relative numbers of the ranges of different system variables may be similar, the absolute numbers may be different.

Figure 3:
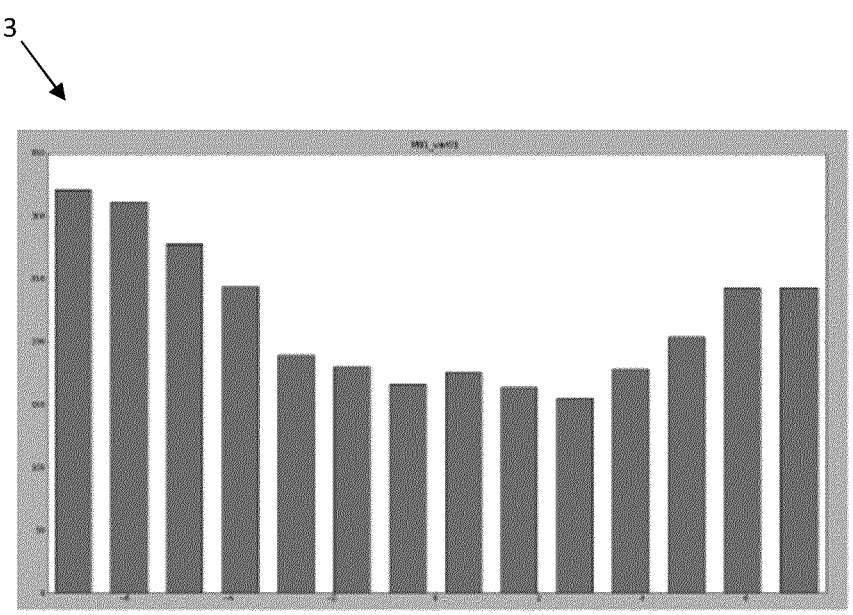
FIG. 3 shows an initial sampling distribution, comprising variables that have been part of simulated initial sampling sets that have given rise to failed simulations.

FIG. 3 shows an example of an initial sampling distribution (3) according to an embodiment of the present invention. Here the initial sampling distribution is a discrete probability distribution showing the failure distribution of a specific system variable. The shape of the initial sampling distribution is dependent on its impact on the yield of the integrated circuit, wherein a system variable which has a generally lower impact may be expected to have a different distribution, such as a more uniform distribution.

Figure 4:
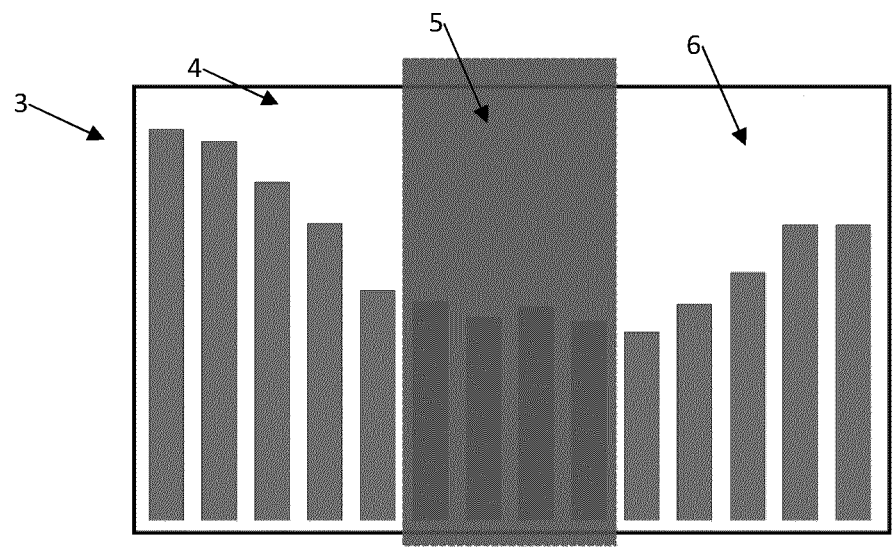
FIG. 4 shows the weighing of an initial sampling distribution wherein the number of samples falling within a lower and an upper portion is compared, according to an embodiment of the present disclosure.

FIG. 4 shows how the initial sampling distribution (3) is measured, for providing parameters for building an importance sampling distribution, such as parameters of a mixture distribution, according to an embodiment of the present disclosure. The initial sampling distribution may be divided into three separate section, a lower section (4), a center section (5) and an upper section (6), such as by dividing the range of the uniform distribution in three, which may have equal lengths. The number of failures within each, or the relative number of failures, of the lower section (4) and the upper section (6) of the initial sampling distribution may be used in order to acquire parameters that are used in building the importance sampling distribution, such as the transformation of a provided distribution.

Figure 5:
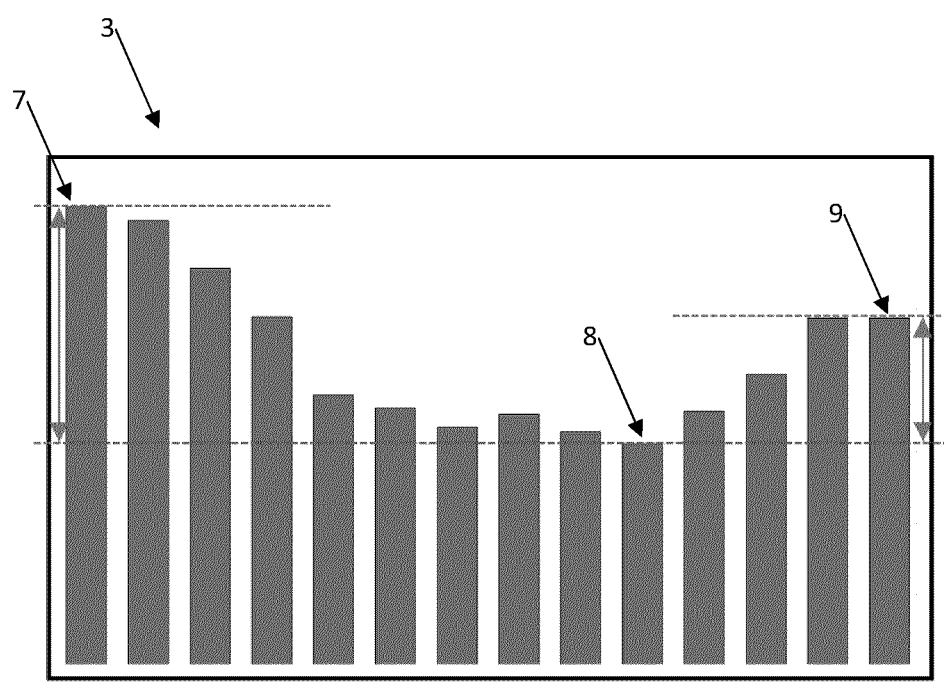
FIG. 5 shows the weighing of an initial sampling distribution wherein the maximum value in parts of the initial sampling distribution is compared to the minimum value in another part of the distribution, such as the maximum at the outer edges of the distribution compared to the global minimum value, according to an embodiment of the present disclosure.

FIG. 5 shows how the initial sampling distribution (3) is measured, for providing parameters for building an importance sampling distribution, such as parameters of a mixture distribution, according to an embodiment of the present disclosure. Different parts of the initial sampling distribution may be used in order to perform the weighing, such as the values at the outermost parts, the lower (7) and the upper (9), of the initial sampling distribution divided by the global minimum (8). The two resulting values may thereafter be used in order to build the importance sampling distribution from the provided distribution, wherein the acquired parameters may be parameters of the mixture distribution.

Figure 6:
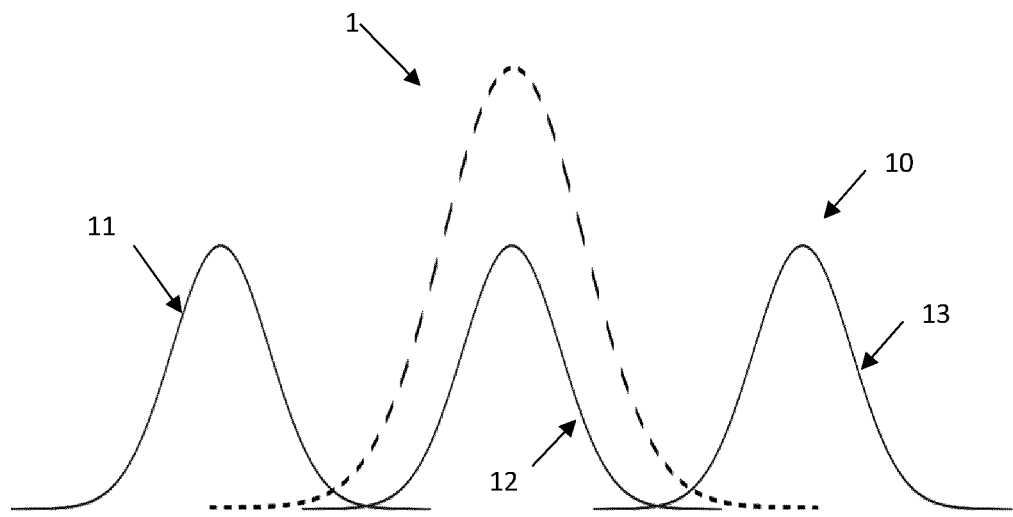
FIG. 6 shows a provided Gaussian distribution together with a built importance sampling distribution having multiple sub-distributions, such as three. Wherein each sub-distribution is a Gaussian distribution generated by weighing of the initial sampling distribution and a transformations of the provided distribution, of that variable, according to an embodiment of the present disclosure.

FIG. 6 shows a provided distribution (1) of a system variable together with a mixture Gaussian distribution (10), of an importance sampling distribution, having a lower portion (11), a center portion (12) and an upper portion (13), according to an embodiment of the current invention. A function may be applied to the provided distribution such that it is transformed multiple times for the generation of the sub-distributions of the mixture distribution. The transformation may further be a function of the initial sampling distribution such that different parameters of the mixture distribution is affected depending on the initial sampling distribution. This may, but are not limited to, include the shift of the mean, the variance and the scaling of the distributions.

Figure 7:
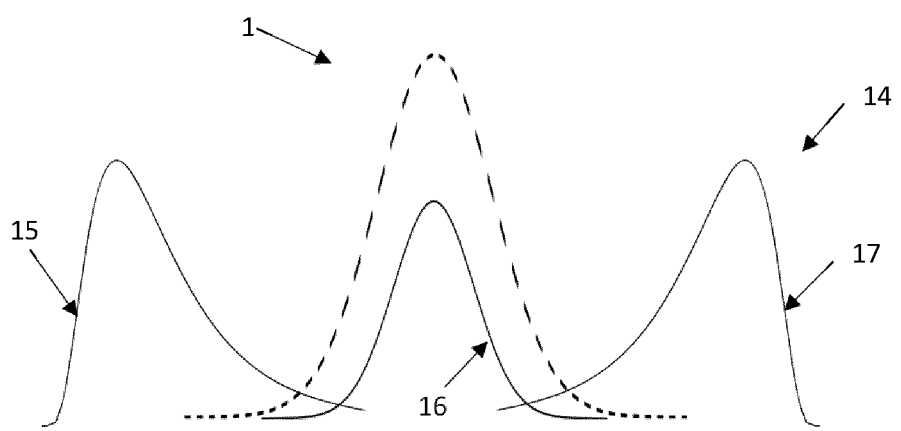
FIG. 7 shows a provided distribution together with a built importance sampling distribution having multiple sub-distributions, such as three. Wherein the sub-distributions are a mix of lognormal and Gaussian distributions, generated by weighing of the initial sampling distribution and a transformations of the provided distribution, of that variable, according to an embodiment of the present disclosure.

FIG. 7 shown an alternative embodiment of the present invention wherein the mixture distribution comprises log-normal (15, 17) and Gaussian (16) sub-distributions. The transformation of a provided distribution (1), for the specific variable, may parameters acquired by the analysis of the initial sampling distribution, in order to build the importance sampling distribution (14), having three separate portions, a lower portion (15), a center portion (16) and an upper portion (17).

Figure 8:
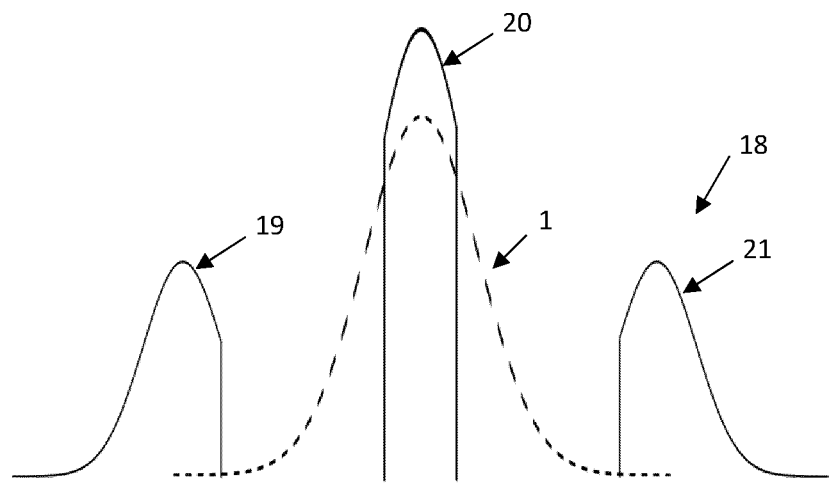
FIG. 8 shows a provided Gaussian distribution according to an embodiment of the present invention together with a resulting importance sampling distribution, wherein the different sub-distributions thereof have been truncated.

FIG. 8 shows a provided Gaussian distribution (1) together with a resulting importance sampling distribution (18), wherein different portions have been truncated according to an embodiment of the present invention. The truncation may be a function of the provided distribution and the importance sampling distribution such that the truncation occurs in ranges where the importance sampling distribution has a value that is above or below a threshold value, such as the value of the provided distribution. The resulting truncated mixture distribution may comprise a lower portion (19), a center portion (20) and an upper portion (21). Truncated sub-distributions of the importance sampling distribution may be truncated Gaussian distribution and/or truncated lognormal distribution and/or other statistical distributions.

Figure 9:
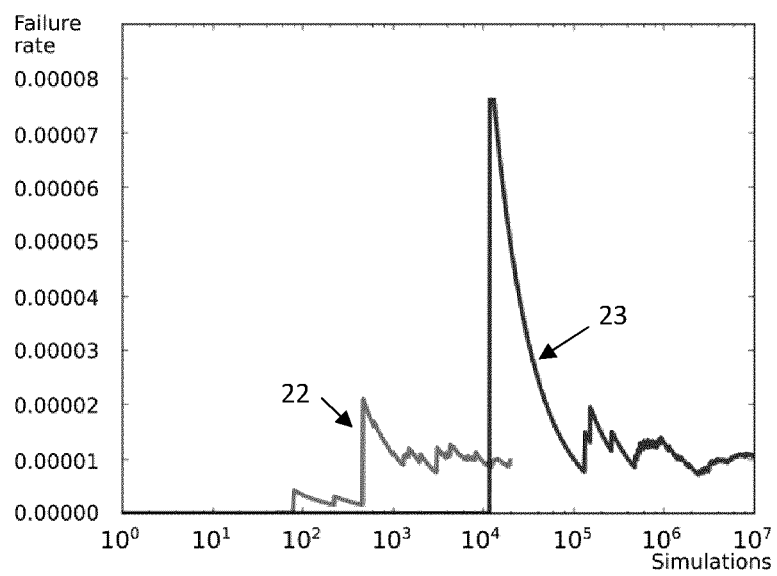
FIG. 9 shows examples of simulation results of normal Monte Carlo simulation and by the use of a method according to an embodiment of the present invention.

FIG. 9 shows examples of simulation results of normal Monte Carlo simulations and by the use of a method according to an embodiment of the present invention (22). The simulations converges to a yield value more than an order of 3 times faster than normal Monte Carlo simulations (23). Faster simulations allow for higher accuracy and efficiency of the simulations and further decreases the costs associated with computational resources.

FURTHER DETAILS OF THE INVENTION

1. A computer-implemented method for simulation of an integrated circuit for yield analysis of the integrated circuit, the method comprising the steps of:
a) for a plurality of variables, generating initial sampling sets by sampling from distributions, which are based on provided distributions, related to physical properties of the integrated circuits;
b) selecting at least one sample from each initial sampling set randomly and combining the selected samples into an initial simulation set;
c) running an initial simulation of an operation of the integrated circuit, applying the initial simulation set, wherein the operation has a criterion for passing and failing the operation;
d) if the initial simulation fails: storing the samples of the initial simulation set into initial sampling distributions for each variable;
e) repeating steps b)-d) until a sufficient number of failures have been obtained;
f) building importance sampling distributions based on each initial sampling distribution, the importance sampling distributions having a lower portion, a center portion and an upper portion;
g) generating a secondary simulation set by drawing a number of samples from the importance sampling distribution for each variable;
h) simulating the integrated circuit by applying the secondary simulation set;
i) repeating steps g)-h) a number of times;
j) mapping of the resulting yields to the provided distributions, thereby obtaining a yield of the integrated circuit.

2. The method according to item 1, wherein the number of times for repeating steps b)-d) are predetermined, such as a given number of simulations or a given number of failures, and/or wherein the steps are repeated until saturation of the initial sampling distributions is achieved.

3. The method according to any of the preceding items, wherein the number of times for repeating steps g)-h) are predetermined, such as a given number of simulations or a given number of failures, and/or wherein the steps are repeated until saturation of the resulting yield is achieved.

4. The method according to any of the preceding items, wherein the initial sampling sets are generated by sampling from uniform distributions.

5. The method according to any of the preceding items, wherein the initial simulation sets are generated by selecting, from the initial sampling sets, an equal amount of samples, such as one sample, for each variable.

6. The method according to any of the preceding items, wherein, for each variable, the initial sampling set is sampled from a uniform distribution that is based on the provided distribution.

7. The method according to item 6, wherein the sampling, for each variable, is carried out over a predefined range of the uniform distribution, such as from $-5\sigma$ to $5\sigma$, from $-6\sigma$ to $6\sigma$ or from $-7\sigma$ to $7\sigma$.

8. The method according to any of the preceding items, wherein the importance sampling distribution for each variable comprises a mixture distribution having a plurality of sub-distributions.

9. The method according to item 8, wherein the importance sampling distribution for each variable comprises three sub-distributions corresponding to the lower portion, the center portion and the upper portion.

10. The method according to item 9, wherein the three sub-distributions of the importance sampling distribution are transformations of the provided distribution according to a function of the initial sampling distribution, for each variable.

11. The method according to item 10, wherein the transformation of the provided distribution for generation of the importance sampling distribution are given by weighing portions of the initial sampling distribution, for each variable.

12. The method according to item 11, wherein the weighing of the initial sampling distribution is carried out by measuring the relative number of samples falling into the portions of the initial sampling distribution, normalized to the width of each portion, for each variable.
13. The method according to item 11, wherein the weighing of the initial sampling distribution is carried out by measuring the relative ratio between a local maximum within each portion of the initial sampling distribution and a minimum of the entire initial sampling distribution, for each variable.
14. The method according to item 11, wherein the weighing of the initial sampling distribution is carried out by linear regression from a local maximum within each portion of the initial sampling distribution to the outer edges of the entire initial sampling distribution, for each variable.
15. The method according to item 11, wherein the weighing is carried out by measuring the relative number of samples falling within the portions of the initial sampling distribution, wherein positions of the portions are given by a predetermined distance from the mean of the provided distribution, for each variable.
16. The method according to any of the preceding items, wherein the sub-distributions of the importance sampling distribution are truncated distributions.
17. The method according to item 16, wherein the truncation is a function of the ratio between the provided distributions and the importance sampling distribution.
18. The method according to any of the preceding items, wherein the importance sampling distribution is given by a mixture distribution comprising Gaussian and/or lognormal distributions.
19. The method according to any of the preceding items, wherein the importance sampling distribution is given by a mixture Gaussian distribution according to:

$$\text{MixGauss}=\lambda N(\mu-f(r_l)\cdot c,\sigma_1^2)+(1-2\lambda)\cdot N(\mu,\sigma_2^2)+\lambda N(\mu-f(r_r)\cdot c,\sigma_1^2)$$

where $r_l$ and $r_r$ are weighing parameters derived by weighing the initial sampling distribution, f is an arbitrary function, $N(\mu,\sigma^2)$ denotes a Gaussian function with a mean, $\mu$, and a variance $\sigma^2$, $\lambda$ is a weighing factor determining the relative weight of the center and outer portions and c denotes a control factor.
20. The method according to any of the preceding items, wherein parameters of the importance sampling distributions are dynamically modified following simulations in order to fulfil a predetermined criterion, for each variable.
21. The method according to any of the preceding items, wherein the parameters of the importance sampling distribution are dynamically modified after a certain number of simulations, such as 100, if the failure rate is not within a given range, such as between 5% and 50%, more preferably between 10% and 35%, most preferably between 15% and 25%.
22. The method according any of the preceding items, wherein the weighing factor, $\lambda$, is dynamically modified if a predetermined criterion is fulfilled.
23. The method according to any of the preceding items, wherein the control factor, c, is dynamically modified if a predetermined criterion is fulfilled.
24. The method according to any of the preceding items, wherein $\sigma^2$ equals 1.
25. The method according to any of the preceding items, wherein the step of generating initial sampling sets is carried out for each variable independently.
26. The method according to any of the preceding items, wherein the integrated circuit is an SRAM circuit.
27. The method according to any of the preceding items, wherein the method is used for obtaining rare failure events.
28. A computer program having instructions, which, when executed by a computing device or system, cause the computing device or system to simulate an integrated circuit to obtain a yield analysis of the integrated circuit according to any of items 1-27.
29. A system for circuit yield analysis for evaluating rare failure events occurring in an integrated circuit design, the system comprising:
  a. a processor; and
  b. a memory having instructions stored thereon that, when executed by the processor, cause the processor to:
   I. for a plurality of variables, generate initial sampling sets by sampling from distributions, which are based on provided distributions, related to physical properties of the integrated circuits;
   II. selecting at least one sample from each initial sampling set randomly and combining the selected samples into an initial simulation set;
   III. performing an initial simulation of an operation of the integrated circuit, applying the initial simulation set, wherein the operation has a criterion for passing and failing the operation;
   IV. if the initial simulation fails: storing the samples of the initial simulation set into initial sampling distributions for each variable;
   V. repeating steps II-IV, until a sufficient number of failures have been obtained;
   VI. building importance sampling distributions based on each initial sampling distribution, the importance sampling distributions having a lower portion, a center portion and an upper portion;
   VII. generating a secondary simulation set by drawing a number of samples from the importance sampling distribution for each variable;
   VIII. simulating the integrated circuit by applying the secondary simulation set;
   IX. repeating steps VII-VIII, a number of times;
   X. mapping of the resulting yields to the provided distributions, thereby obtaining a yield of the integrated circuit.
30. The system of item 29, wherein the instructions, when executed by the processor, cause the processor to perform the method according to any of items 1-27.

The invention claimed is:
1. A computer-implemented method for simulation of an integrated circuit for yield analysis of the integrated circuit, the method comprising the steps of:
  a) for a plurality of variables, generating initial sampling sets by sampling from distributions, which are based on provided distributions, related to physical properties of the integrated circuits;
  b) selecting at least one sample from each initial sampling set randomly and combining the selected samples into an initial simulation set;
  c) running an initial simulation of an operation of the integrated circuit, applying the initial simulation set, wherein the operation has a criterion for passing and failing the operation;
  d) if the initial simulation fails: storing the samples of the initial simulation set into initial sampling distributions for each variable;
  e) repeating steps b)-d) a first number of times;

f) building importance sampling distributions based on each initial sampling distribution, wherein the importance sampling distribution comprises a mixture distribution having three sub-distributions corresponding to a lower portion, a center portion and an upper portion, wherein the three sub-distributions of the importance sampling distribution are transformations of the provided distribution according to a function of the initial sampling distribution for each variable, wherein the transformation of the provided distribution for generation of the importance sampling distribution are given by weighing portions of the initial sampling distribution for each variable;

g) generating a secondary simulation set by drawing a number of samples from the importance sampling distribution for each variable;

h) simulating the integrated circuit by applying the secondary simulation set;

i) repeating steps g)-h) a second number of times;

j) mapping of the resulting yields to the provided distributions, thereby obtaining a yield of the integrated circuit.

2. The method according to claim 1, wherein the first number of times for repeating steps b)-d) comprise:
a predetermined number of times being a given number of simulations or a given number of failures; and/or
a repeated number of times until saturation of the initial sampling distributions is achieved.

3. The method according to claim 1, wherein the initial sampling sets are generated by sampling from uniform distributions.

4. The method according to claim 1, wherein the initial simulation sets are generated by selecting, from the initial sampling sets, an equal amount of samples, such as one sample, for each variable.

5. The method according to claim 1, wherein, for each variable, the initial sampling set is sampled from a uniform distribution that is based on the provided distribution.

6. The method according to claim 1, wherein the weighing of the initial sampling distribution is carried out by measuring the relative ratio between a local maximum within each portion of the initial sampling distribution and a minimum of the entire initial sampling distribution, for each variable or wherein the weighing of the initial sampling distribution is carried out by linear regression from a local maximum within each portion of the initial sampling distribution to the outer edges of the entire initial sampling distribution, for each variable.

7. The method according to claim 1, wherein the sub-distributions of the importance sampling distribution are truncated distributions and/or wherein the importance sampling distribution is given by a mixture distribution comprising Gaussian and/or lognormal distributions.

8. The method according to claim 1, wherein parameters of the importance sampling distributions are dynamically modified following simulations in order to fulfil a predetermined criterion, for each variable wherein the parameters of the importance sampling distribution are dynamically modified after a number of simulations if the failure rate is not within a given range.

9. The method according to claim 8, wherein the given range is between 5% and 50%.

10. The method according to claim 8, wherein the given range is between 10% and 35%.

11. The method according to claim 8, wherein the given range is between 15% and 25%.

12. The method according to claim 1, wherein the weighing factor, $\lambda$, is dynamically modified if a predetermined criterion is fulfilled and/or wherein the control factor, c, is dynamically modified if a predetermined criterion is fulfilled.

13. The method according to claim 1, wherein the step of generating initial sampling sets is carried out for each variable independently.

14. A computer program product having a non-transitory computer readable media storing instructions, which, when executed by a computing device or system, cause the computing device or system to simulate an integrated circuit to obtain a yield analysis of the integrated circuit according to claim 1.

15. The method according to claim 1, wherein the second number of times for repeating steps g)-h) comprise
a predetermined number of times being a given number of simulations or a given number of failures; and/or
a repeated number of times until saturation of the resulting yield is achieved.

16. A system for circuit yield analysis for evaluating rare failure events occurring in an integrated circuit design, the system comprising:
a. a processor; and
b. a memory having instructions stored thereon that, when executed by the processor, cause the processor to:
I. for a plurality of variables, generate initial sampling sets by sampling from distributions, which are based on provided distributions, related to physical properties of the integrated circuits;
II. selecting at least one sample from each initial sampling set randomly and combining the selected samples into an initial simulation set;
III. performing an initial simulation of an operation of the integrated circuit, applying the initial simulation set, wherein the operation has a criterion for passing and failing the operation;
IV. if the initial simulation fails: storing the samples of the initial simulation set into initial sampling distributions for each variable;
V. repeating steps II-IV, a first number of times;
VI. building importance sampling distributions based on each initial sampling distribution, wherein the importance sampling distribution comprises a mixture distribution having three sub-distributions corresponding to a lower portion, a center portion and an upper portion, wherein the three sub-distributions of the importance sampling distribution are transformations of the provided distribution according to a function of the initial sampling distribution for each variable, wherein the transformation of the provided distribution for generation of the importance sampling distribution are given by weighing portions of the initial sampling distribution for each variable;
VII. generating a secondary simulation set by drawing a number of samples from the importance sampling distribution for each variable;
VIII. simulating the integrated circuit by applying the secondary simulation set;
IX. repeating steps VII-VIII, a second number of times;
X. mapping of the resulting yields to the provided distributions, thereby obtaining a yield of the integrated circuit.

* * * * *